United States Patent
Patterson

(10) Patent No.: US 7,392,646 B2
(45) Date of Patent: Jul. 1, 2008

(54) REVERSIBLE FEED ROLLER WITH RADIALLY EXTENDIBLE FINGERS

(75) Inventor: Roger L. Patterson, Selkirk (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 308 days.

(21) Appl. No.: 11/153,900

(22) Filed: Jun. 16, 2005

(65) Prior Publication Data

US 2005/0284124 A1 Dec. 29, 2005

Related U.S. Application Data

(60) Provisional application No. 60/579,652, filed on Jun. 16, 2004.

(51) Int. Cl.
*A01D 89/00* (2006.01)

(52) U.S. Cl. .......................................... 56/364; 198/613

(58) Field of Classification Search .................. 56/12.4, 56/12.5, 14.5, 364; 198/722, 613, 693
See application file for complete search history.

(56) References Cited

U.S. PATENT DOCUMENTS

| 2,701,634 | A | * | 2/1955 | Carroll | 198/518 |
|---|---|---|---|---|---|
| 4,751,811 | A | * | 6/1988 | Groothuis | 56/364 |
| 5,620,083 | A | | 4/1997 | Vogelgesang | |
| 5,768,868 | A | * | 6/1998 | Stein | 56/14.5 |
| 5,813,205 | A | * | 9/1998 | Gosa | 56/364 |
| 6,430,904 | B1 | * | 8/2002 | Coers et al. | 56/10.3 |
| 6,640,527 | B2 | * | 11/2003 | Farley et al. | 56/12.4 |

\* cited by examiner

*Primary Examiner*—Thomas B Will
*Assistant Examiner*—Mai T Nguyen
(74) *Attorney, Agent, or Firm*—Adrian D. Battison; Michael R. Williams; Ryan W. Dupuis

(57) ABSTRACT

A feed roller primarily for feeding crop into a feeder house of a combine harvester is located above and behind a feed draper and includes an outer flight and retractable fingers for feeding the crop through the zone behind the draper and into the feeder house. The fingers rotate about a finger axis offset from the roller axis so that they extend to a maximum at the draper and are retracted behind the roller to release the crop. When the roller is reversed to release a blockage, the fingers are also reversed in direction and the finger axis is moved rearwardly to the opposite side of the roller so that the fingers are extended behind the roller at the feeder house and retracted at the draper. This movement is done automatically on reversing the roller and uses power from the reversal to move the finger axis using a clutch. An anti-distortion wheel is mounted on the finger shaft to prevent retraction of the finger ends into the roller which can cause damage by loss of proper guidance.

18 Claims, 12 Drawing Sheets

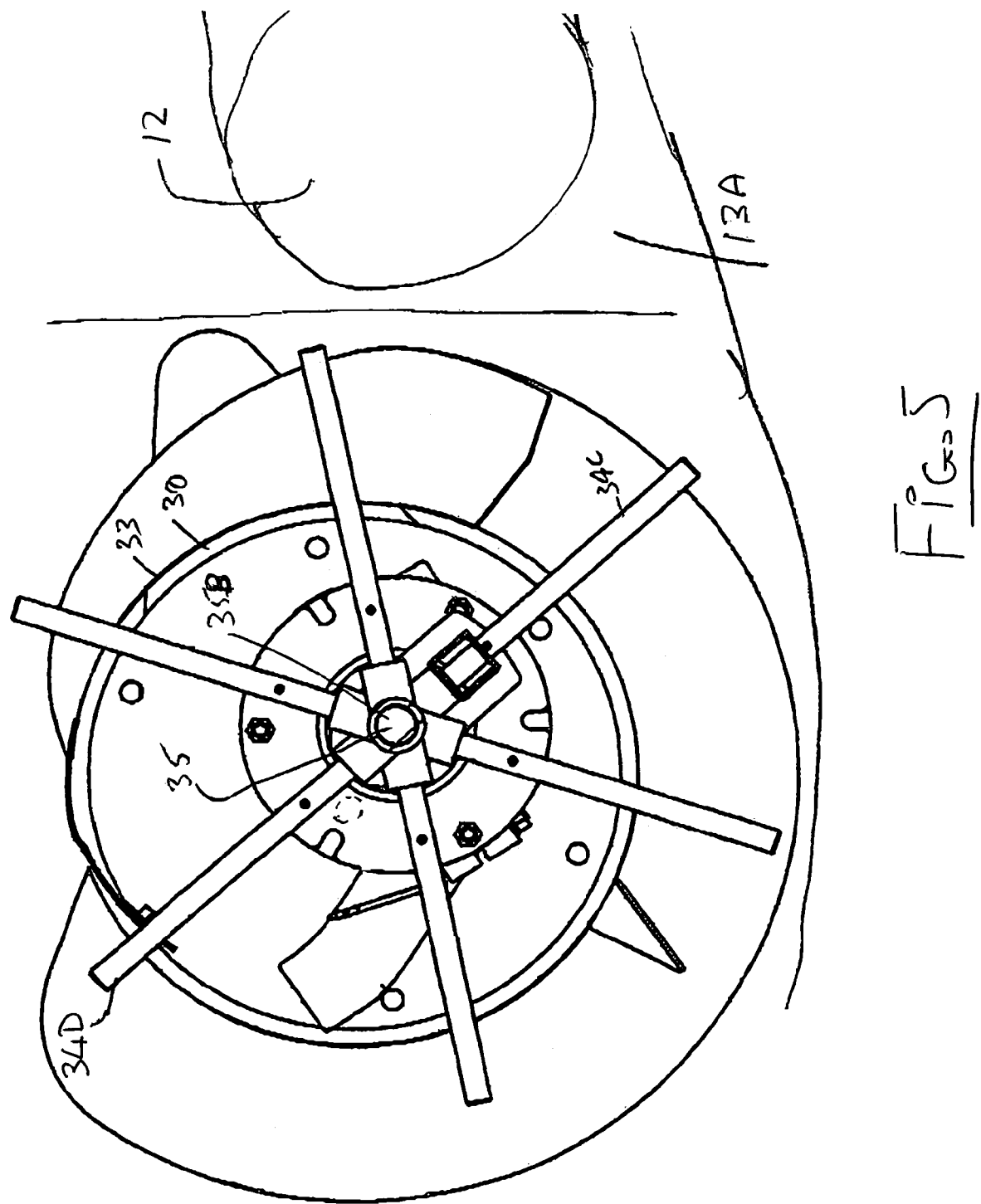

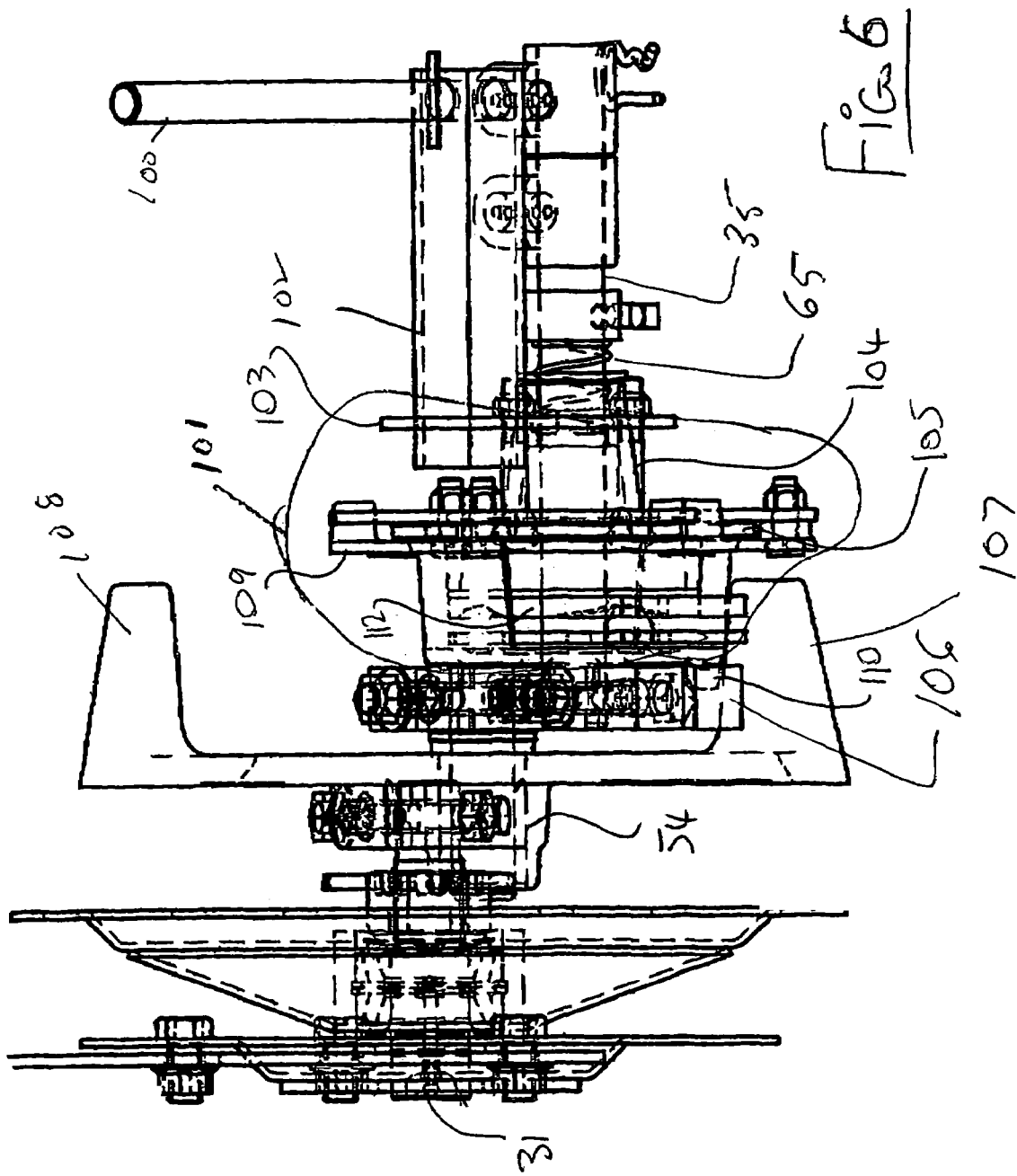

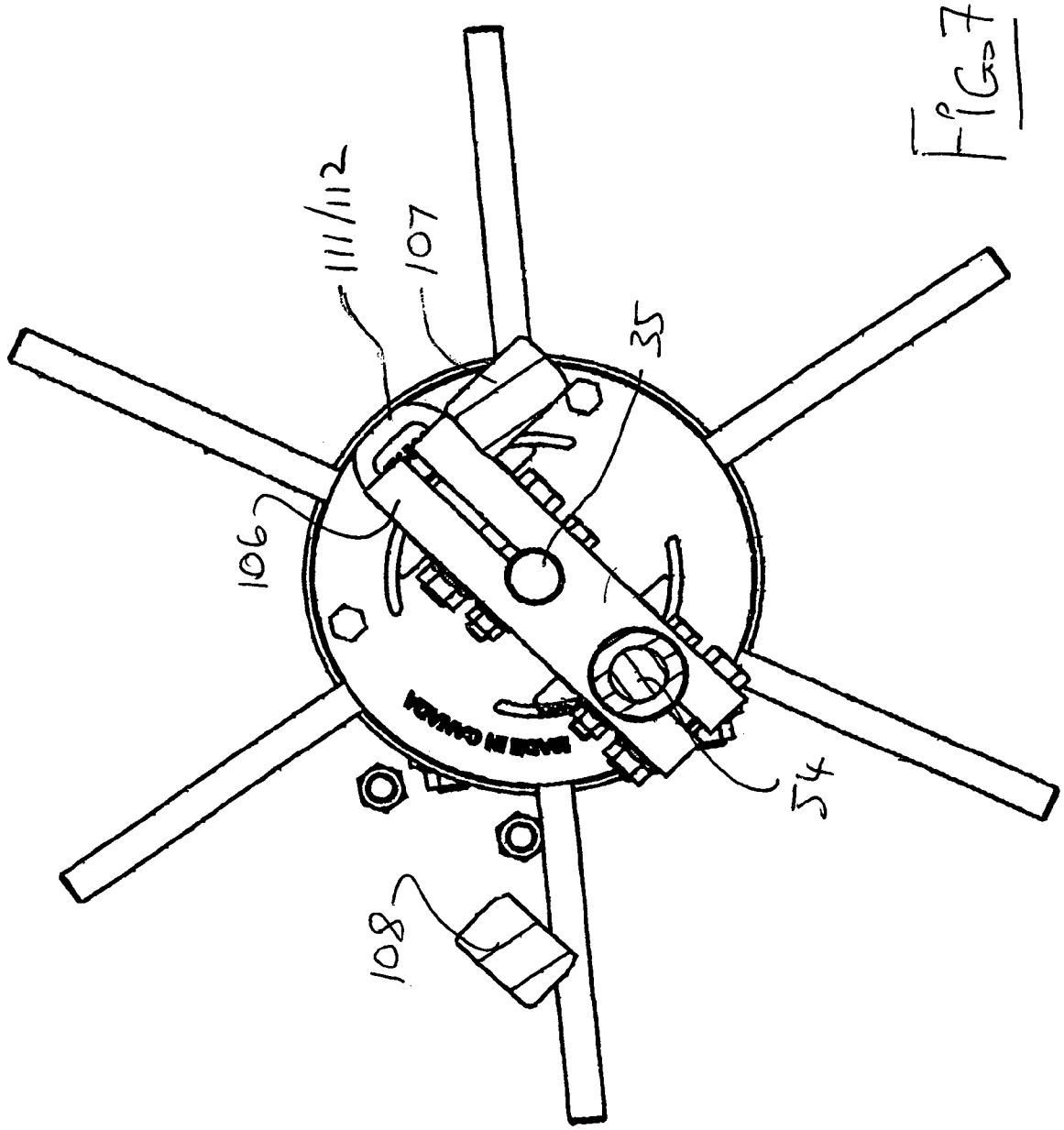

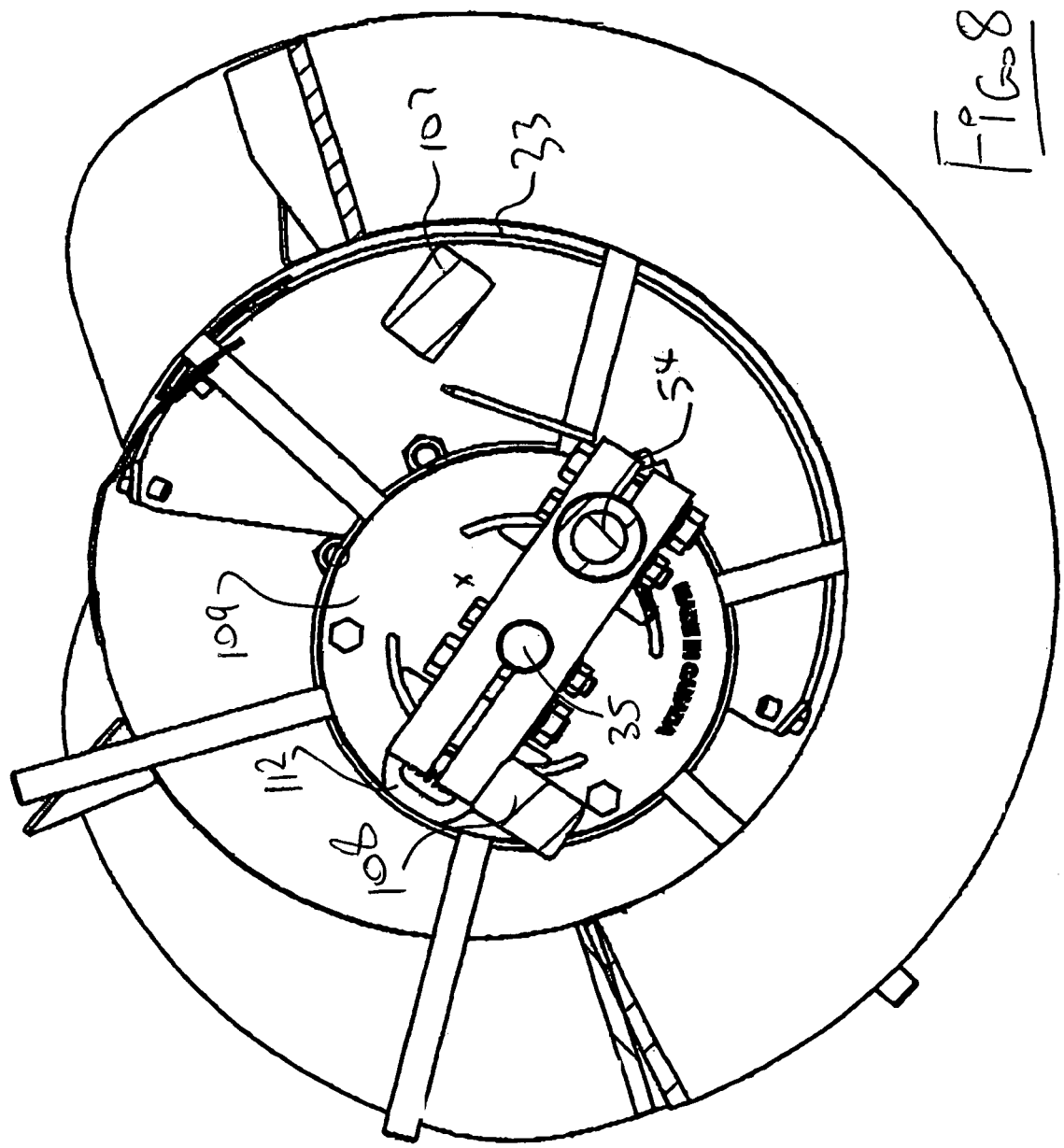

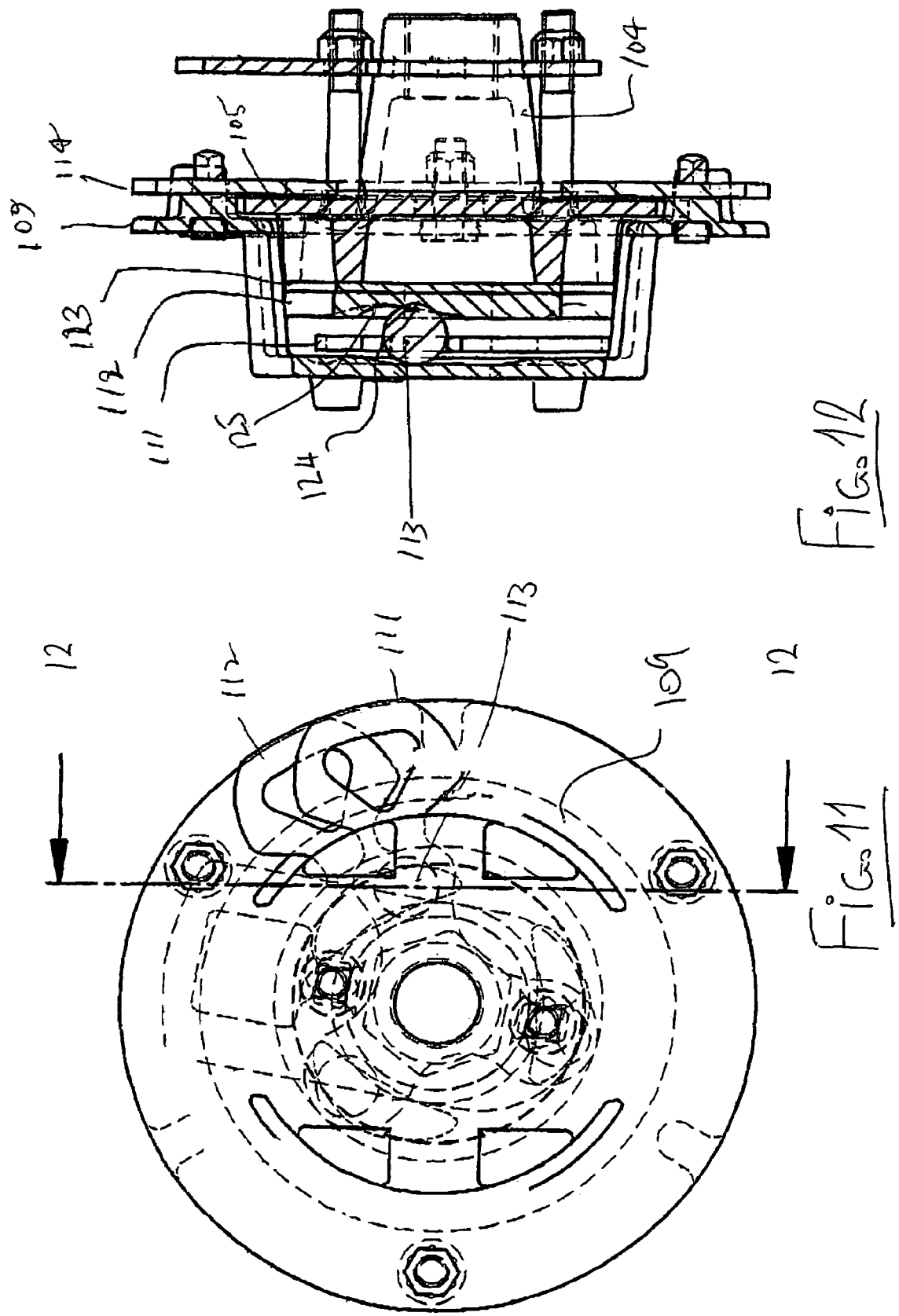

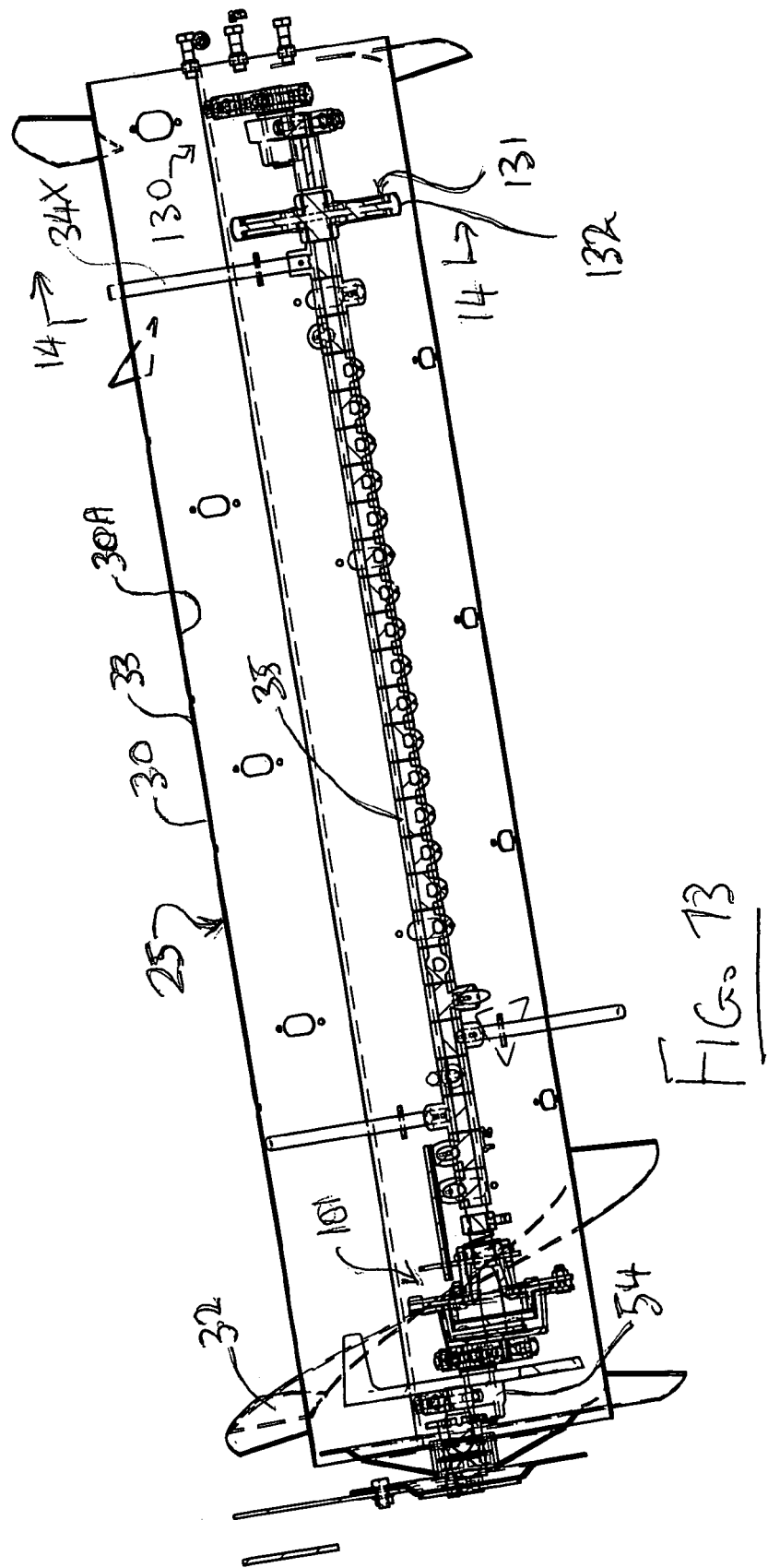

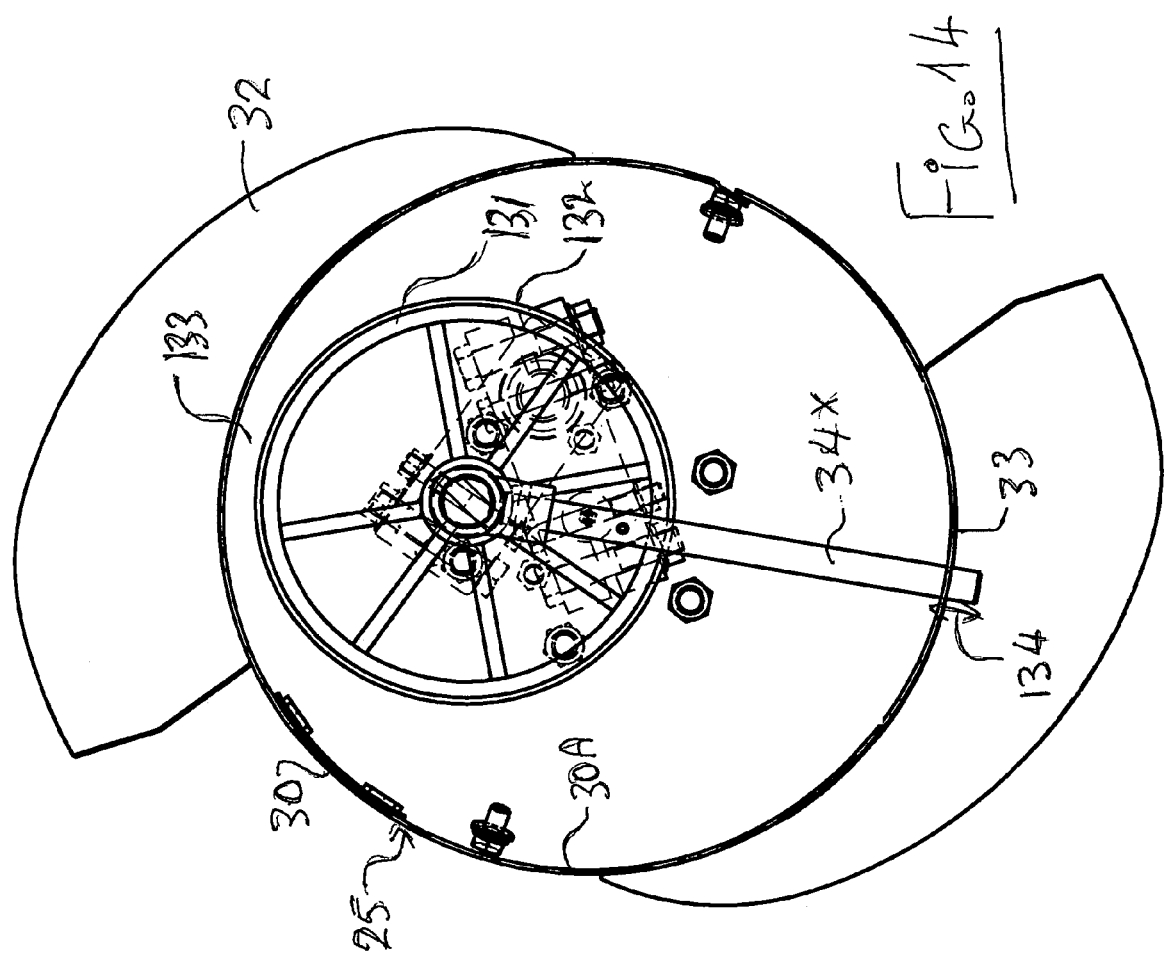

REVERSIBLE FEED ROLLER WITH RADIALLY EXTENDIBLE FINGERS

This application claims the benefit under 35 U.S.C. 119 of the filing date of Provisional Application No. 60/579,652 filed Jun. 16$^{th}$, 2004.

This invention relates to a reversible feed roller of the type having generally radially extending fingers which rotate about a finger axis offset from the roller axis so that their length extending from the roller surface changes around the roller axis for engaging into and for releasing the crop.

BACKGROUND OF THE INVENTION

Feed rollers are commonly used in crop harvesting machines for guiding the crop from a position in front of the roller to a position rearwardly of the roller. Such rollers are used in many different locations in crop feeding systems and the arrangement described herein is not limited to any particular location of such a crop feeding roller.

However one primary use of such rollers is in that of guiding the crop from a harvesting header into the feeder house of a combine harvester. Such headers can be of the type which simply provide a cutter bar across the front of the header using any suitable cutting technique behind which is located the guide roller which includes an auger flight for transporting the crop material inwardly from the width of the cutter bar to the narrower width of the feeder house.

Other arrangements include a feed draper system so that the crop is transported primarily from the width of the cutter bar inwardly to the narrow width of the feeder house using one or more side drapers which carry the crop to a central feed draper which moves rearwardly toward the feeder house. Arrangements of this type are manufactured by a number of manufactures but primarily by the assignee herein. In the draper header system, the feed roller is therefore much narrower since it is only intended to guide the material into the feeder house rather than the transport the material wholly along the length of the header. In many cases therefore the roller is also of smaller diameter.

In all of these arrangements, the roller generally includes a series of angularly and axially spaced fingers which project through the peripheral wall forming the roller and outwardly from the outer peripheral surface of the roller so as to engage the crop.

The fingers are mounted for rotation around a finger axis which is offset from the roller axis. The fingers are driven in their rotation by their engagement with the peripheral wall of the roller. The offset position of the finger axis thus presents the fingers so that there maximum extend from the peripheral surface of the roller is located at the location where the fingers are intended to engage and grasp the crop and the minimum extent is located at the position where the fingers are intended to release the crop. Thus the fingers generally are at their maximum extent at a position directly forwardly of the roller and the fingers rotate with the roller around the underneath of the roller and are retracted as they move behind the roller to allow the crop to be released to enter into the feeder house to be engaged by the feeder chain of the feeder house. At the position rearward of the roller, the fingers are retracted by the position of the finger axis to locations substantially flush with the surface of the roller to release the crop.

This arrangement is well established, widely used and has been widely successful.

One problem which arises with combine harvesters of this general type either using an auger type header or using a draper type header is that over feeding of the crop material into the feeder house can cause a blockage either at the entry to the feeder house or within the feeder house or even at the rotor of the combine harvester. In has become commonly accepted that the technique for removing such blockages is to reverse the feeder chain within the feeder house and to reverse the direction of drive of the roller so that the crop is reverse fed from the blockage forwardly and discharged onto the ground in front of the header. This arrangement has been found to properly and effectively remove such blockages without the necessity for the operator to leave the cab and carry out manual operations of the crop material.

However in some cases there is a tendency for the crop material to collect in the area in front of the feed roller or to be back fed around the feed roller in a wrapping action. If either of these events occurs, there is a significant risk that the material will become compressed in these areas leading to a blockage which cannot be released by operation of the machine and requires the manual intervention of the operator. Such manual intervention requires vigorous physical activity to cut away compacted wrapped crop material using a knife or other suitable tools.

It is common to provide adjustment of the position of the finger axis over a relatively small distance in the position in front of the roller axis so as to slightly angularly adjust the angular position of the maximum extension of the fingers relative to the roller axis. However this is intended merely to adjust the operation in the feeding direction.

In European No: 0567192 (Boucquez) assigned to New Holland which patent was filed in 1992 and granted in 1996, the patent is directed to the concept of providing an actuator which moves the position of the eccentric crank about which the fingers rotate. The adjustment is therefore effected on the go. It is also discussed that the adjustment can be effected so as to take up a position suitable for the reverse rotation of the roller. The pivotal movement of the finger axis takes place about the axis of the roller.

In U.S. Pat. No. 5,620,083 (Vogelgesang) assigned to Deere the patent refers to the above European patent as prior art and is directed to an arrangement which uses no actuator but instead uses the forces from the crop on the ends of the exposed fingers to tilt the finger shaft to a different position using the wall of the roller as a fulcrum. The pivotal movement of the finger axis takes place about the axis of the roller.

SUMMARY OF THE INVENTION

It is one object of the invention to provide a reversible feed roller which is arranged to improve feeding of the crop in the reverse direction.

According to one aspect of the invention there is provided a feed roller apparatus comprising:

a roller;

a mounting assembly mounting and driving the roller for rotation about a longitudinal axis of the roller in a forward direction and in a reverse direction;

a crop feed assembly cooperating with the roller such that movement of an outer peripheral surface of the roller in the forward direction causes feeding of a crop material around the axis of the roller from a supply location on one side of an axial plane of the roller to a receiving location on the other side of the axial plane of the roller;

the crop feed assembly and the roller being arranged for rotation of the roller in the reverse direction for back-feeding of the crop material in the event of a blockage;

a plurality of fingers arranged at axially and angularly spaced locations around the roller;

each finger having an inner end inside an interior of the roller and arranged to project outwardly from the interior of the roller through the peripheral surface to an outer end for engaging the crop material on the exterior of the roller for assisting in transferring the crop material from the supply location to the receiving location;

the fingers having the inner ends thereof mounted on a finger support assembly within the roller for rotation of the fingers about a finger axis defined by the support assembly;

the fingers each extending through an opening in the peripheral surface of the roller such that the fingers are driven in rotation about the finger axis by rotation of the roller about the roller axis;

the finger support assembly being arranged to locate the finger axis at a location which is offset from the roller axis such that a portion of the fingers which extends beyond the peripheral surface varies around the roller axis from an extended maximum extent to a retracted minimum extent;

the finger support assembly being arranged to define for the fingers, with the roller arranged to rotate in the forward direction, a first finger axis position which is located on the side of the axial plane adjacent the supply location such that the extended maximum extent is adjacent the supply location and the retracted minimum extent is adjacent the receiving location;

and the finger support assembly being arranged to define for the fingers, with the roller arranged to rotate in the reverse direction, a second finger axis position which is located on the side of the axial plane adjacent the receiving location such that the extended maximum extent is adjacent the receiving location and the retracted minimum extent is adjacent the supply location;

wherein the finger support assembly includes elements which are pivotal about a pivot axis which is offset from the axis of the roller such that the finger axis moves in an arc about said pivot axis.

Preferably the finger support assembly is arranged to move the finger axis from the first position to the second position automatically when the direction of rotation of the roller is changed to the reverse direction and to move the finger axis from the second position to the first position automatically when the direction of rotation of the roller is changed from the reverse direction to the forward direction. This is preferably achieved in response to the change in direction of the roller by a force generated by the rotation of the roller.

However the same movement can be achieved using a separate actuator which does not derive power from the reversal of the roller but uses other power available on the harvesting machine. Thus the switch which actuates the reverse movement can be used also to operate a separate actuator particularly provided to move the finger axis.

In the arrangement which uses the power of reversal of the roller, preferably the finger support assembly includes a clutch which is driven in response to rotation of the roller, the clutch being disengaged when the roller rotates in one direction beyond a predetermined angle and is engaged when the roller changes to the other direction.

Preferably the finger support assembly includes two angularly spaced stops each defining a respective one of the first and second positions.

Preferably the finger support assembly includes a drive coupling for receiving driving force from at least one of the fingers.

Preferably the peripheral surface of the roller carries a helical flight and wherein the fingers in their maximum extent project outwardly beyond the outer edge of the flight.

The above roller arrangement is preferably used in a harvesting machine having a feeder house having a conveyor chain therein for transporting a crop material where the roller is located in front of the feeder house for feeding the crop material into the feeder house.

Preferably the harvesting machine includes a draper in front of the feed roller apparatus.

Thus the arrangement described herein is designed to automatically readjust the position of the finger pivot shaft so that the fingers are extended the maximum at the rear to engage the crop and convey it from the feeder house. At the same time the finger are approximately flush with the auger tube at the front so that the crop falls away from the auger and can be discharged from the header.

There is a clutch mounted such that it is driven by the auger. When the auger rotates in reverse, it causes the clutch to be engaged so that it rotates the finger shaft about a mounting pivot so that the finger shaft is positioned in the optimum position for reversing the crop out of the header and releasing it so that it can be fed out of the header and not be carried around the auger and jammed against the feeder house face plate. The finger shaft carrier rotates to the reverse position and contacts a reverse stop. The stop causes the clutch to disengage. The auger and feeder house feed chain can be then operated in reverse until the crop is fully cleared from the combine.

When the auger is rotated in the forward direction, the clutch is engaged so that it rotates the finger shaft carrier so that it pivots it to the normal working position. The finger shaft carrier then contacts the forward stop and disengages the clutch. The auger can then be operated normally until the auger and feeder house needs to be reversed to clear the next crop blockage.

According to a second aspect of the invention there is provided a feed roller apparatus comprising:

a roller;

a mounting assembly mounting and driving the roller for rotation about a longitudinal axis of the roller in a forward direction and in a reverse direction;

a crop feed assembly cooperating with the roller such that movement of an outer peripheral surface of the roller in the forward direction causes feeding of a crop material around the axis of the roller from a supply location on one side of an axial plane of the roller to a receiving location on the other side of the axial plane of the roller;

the crop feed assembly and the roller being arranged for rotation of the roller in the reverse direction for back-feeding of the crop material in the event of a blockage;

a plurality of fingers arranged at axially and angularly spaced locations around the roller;

each finger having an inner end inside an interior of the roller and arranged to project outwardly from the interior of the roller through the peripheral surface to an outer end for engaging the crop material on the exterior of the roller for assisting in transferring the crop material from the supply location to the receiving location;

the fingers having the inner ends thereof mounted on a finger support assembly within the roller for rotation of the fingers about a finger axis defined by the support assembly;

the fingers each extending through an opening in the peripheral surface of the roller such that the fingers are driven in rotation about the finger axis by rotation of the roller about the roller axis;

the finger support assembly being arranged to locate the finger axis at a location which is offset from the roller axis such that a portion of the fingers which extends beyond the peripheral surface varies around the roller axis from an extended maximum extent to a retracted minimum extent;

the finger support assembly being arranged to define for the fingers, with the roller arranged to rotate in the forward direction, a first finger axis position which is located on the side of the axial plane adjacent the supply location such that the extended maximum extent is adjacent the supply location and the retracted minimum extent is adjacent the receiving location;

and the finger support assembly being arranged to define for the fingers, with the roller arranged to rotate in the reverse direction, a second finger axis position which is located on the side of the axial plane adjacent the receiving location such that the extended maximum extent is adjacent the receiving location and the retracted minimum extent is adjacent the supply location;

wherein there is provided a linkage between the roller and the finger support assembly such that rotation of the roller is communicated through the linkage to effect corresponding movement of the finger axis.

Another problem which can occur is that the finger shaft and supporting parts can in some situations deflect enough for the fingers to retract too far and pull into the auger tube. The fingers thus lose the guidance of the openings in the auger tube and can thus rotate in the tube and destroy parts as they poke new holes in the auger tube. This can be prevented by mounting a wheel on the finger shaft that acts as a stop. If the parts deflect too far then the wheel contacts the inside of the drum before the fingers can pull into the drum on the opposite side.

This problem can occur on any combine header auger but is a bigger problem for the design disclosed in detail hereinafter because of the way the auger assembly is supported.

According to a third aspect of the invention therefore there is provided a crop feed roller apparatus comprising:

a roller;

a mounting assembly mounting and driving the roller for rotation about a longitudinal axis of the roller in a forward direction and in a reverse direction;

a crop feed assembly cooperating with the roller such that movement of an outer peripheral surface of the roller in the forward direction causes feeding of a crop material around the axis of the roller from a supply location on one side of an axial plane of the roller to a receiving location on the other side of the axial plane of the roller;

the crop feed assembly and the roller being arranged for rotation of the roller in the reverse direction for back-feeding of the crop material in the event of a blockage;

a plurality of fingers arranged at axially and angularly spaced locations around the roller;

each finger having an inner end inside an interior of the roller and arranged to project outwardly from the interior of the roller through the peripheral surface to an outer end for engaging the crop material on the exterior of the roller for assisting in transferring the crop material from the supply location to the receiving location;

the fingers having the inner ends thereof mounted on a finger support assembly within the roller for rotation of the fingers about a finger axis defined by the support assembly;

the fingers each extending through a guide opening in the peripheral surface of the roller such that the fingers are driven in rotation about the finger axis by rotation of the roller about the roller axis;

the finger support assembly being arranged to locate the finger axis at a location which is offset from the roller axis such that a portion of the fingers which extends beyond the peripheral surface varies around the roller axis from an extended maximum extent to a retracted minimum extent;

the finger support assembly being arranged to define for the fingers, with the roller arranged to rotate in the forward direction, a first finger axis position which is located on the side of the axial plane adjacent the supply location such that the extended maximum extent is adjacent the supply location and the retracted minimum extent is adjacent the receiving location;

and the finger support assembly being arranged to define for the fingers, with the roller arranged to rotate in the reverse direction, a second finger axis position which is located on the side of the axial plane adjacent the receiving location such that the extended maximum extent is adjacent the receiving location and the retracted minimum extent is adjacent the supply location;

the finger support assembly including a finger shaft around which the fingers rotate with the roller;

wherein the fingers have a length relative to the finger shaft and the roller such that, in the position of retracted minimum extent, the outer end of the finger is approximately flush with the outer surface of the roller and such that, in the event of distortion under load of the finger support assembly, it is possible that the outer end of at least one of the fingers retracts into a release position in which it is released from the guide opening and can thus rotate relative to the roller and cause damage when extended by no longer passing through the guide opening;

and a guide wheel mounted on the finger shaft for rotation around the finger shaft, the guide wheel having an exterior peripheral surface arranged to contact and roll upon an inner surface of the roller to prevent the at least one finger from retracting to the release position.

The above definition refers to a wheel but it will be appreciated that additional wheel or wheels can be provided at different longitudinally spaced positions along the roller if required.

Preferably the wheel is located at a position along the length of the shaft where the possibility for distortion of the finger support assembly is at a maximum. In some embodiments this may be at the end of the roller opposite the clutch. In other embodiments the wheel may be located at the middle of the roller depending on the construction and the type of loading applied causing the distortion.

Preferably the wheel is has a diameter such that the peripheral surface, in a non-distorted position of the finger support assembly, is spaced from the inner surface of the roller and the peripheral surface only touches the inner surface in the position where sufficient distortion has occurred to move the finger nearly to the release position.

BRIEF DESCRIPTION OF THE DRAWINGS

One embodiment of the invention will now be described in conjunction with the accompanying drawings in which:

FIG. 5 is a detailed section of the auger in the reverse unplugging position.

FIG. 6 is a detailed plan view of the internal parts of the roller including the finger support assembly and the clutch with the auger drum or roller removed for convenience of illustration.

FIGS. 7 and 8 are side elevational views of the finger support assembly of FIG. 6 in the forward and reverse positions respectively, the roller being shown in FIG. 8.

FIG. 11 is an end view of the clutch of Figure during movement of the clutch to drive the finger shaft from the forward position to the reverse position.

FIG. 12 is a cross sectional view along the lines 12-12 of FIG. 11.

FIG. 13 is a longitudinal cross-sectional view of the auger with many of the fingers removed for convenience of illustration and showing the anti-distortion wheel.

FIG. 14 is a cross sectional view along the lines 14-14 of FIG. 13.

In the drawings like characters of reference indicate corresponding parts in the different figures.

DETAILED DESCRIPTION

Figure 1:
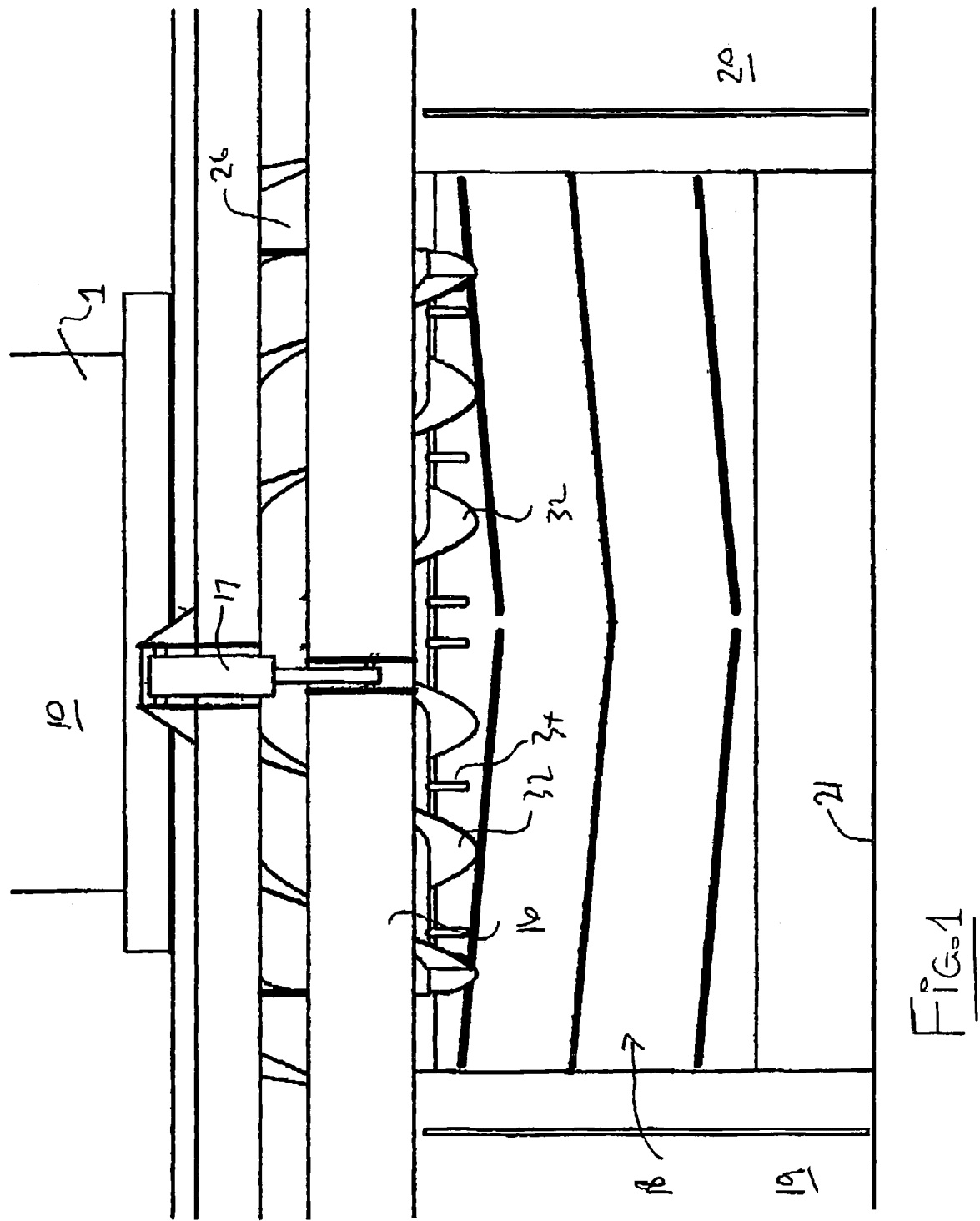
FIG. 1 is a plan view showing the combine feeder house and central section of a header.
Figure 2:
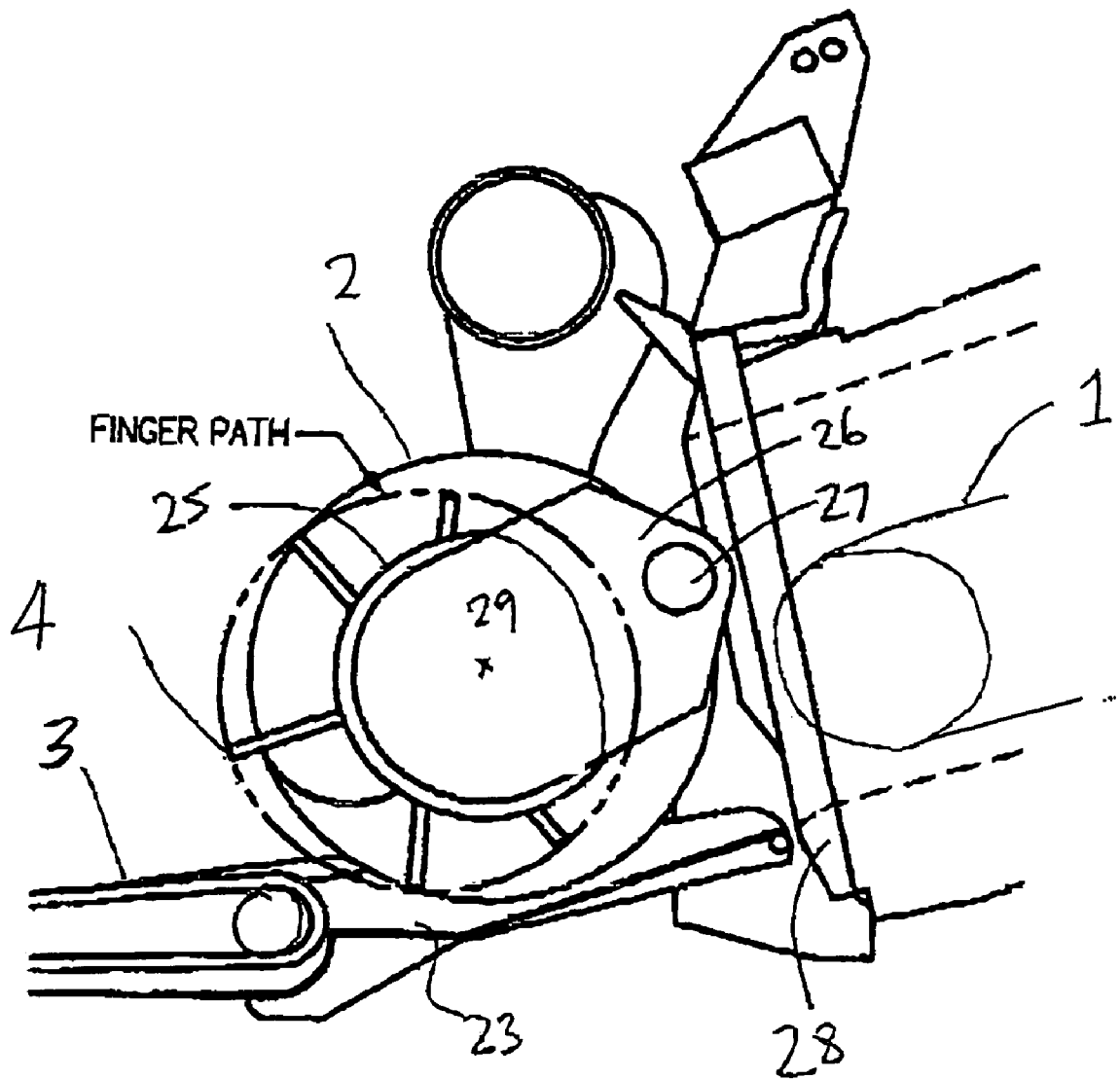
FIG. 2 is a section view through the centerline of the header and feeder house in the normal forward operating position showing the relationship between the feed chain, the auger and the feed draper with the fingers shown in the normal forward position where they can engage crop fed off the feed draper, convey it to the rear and release it so that the feeder house feed chain can feed the crop material into the combine.
Figure 3:
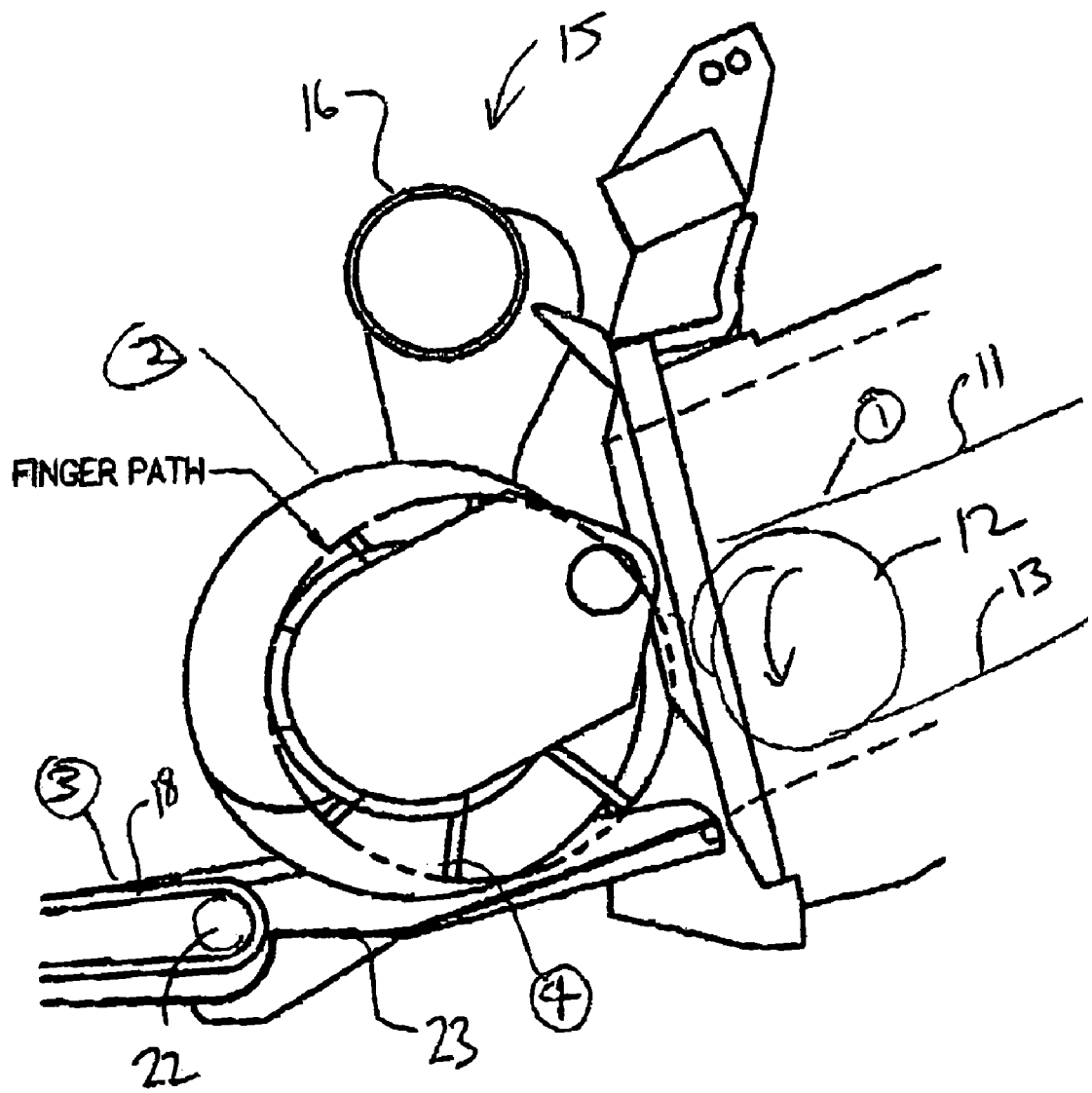
FIG. 3 is a section view similar to that of FIG. 2 through the centerline of the header and feeder house in the reverse unplugging position.

In FIGS. 1, 2 and 3 is shown an arrangement of header and feeder house for a combine harvester of the type generally shown in U.S. Pat. No. 6,675,568 issued Jan. 13$^{th}$, 2004 of the present assignee and Canadian Published Application 2,341, 283 published Sep. 16$^{th}$, 2002, the disclosures of which is incorporated herein by reference.

Details of the main construction of the header are omitted since these are well known to one skilled in the art and are available from the above patent documents. The present arrangement is concerned primarily with the construction of the feed roller which is shown in detail herein so that other arrangements shown in the present documents may vary in accordance with the requirements of a person skilled in the art.

Thus the arrangement as shown comprises a feeder house 10 having a feeder chain 11 mounted within the feeder house for rotation of the feeder chain around a drive sprocket 12 so that crop material is carried underneath the bottom run 13 of the feeder chain along the bottom surface of the feeder house to the operating components of the combine harvester (which we are not shown).

At the forward end of the feeder house is mounted a header construction generally indicated at 15 which is carried on a main frame 16 in the form of a tube which is attached to the forward end of the feeder house by a link 17. Bottom links which support the header are not shown as again these are well known to one skilled in the art.

The header further includes a feed draper 18 which carries the crop rearwardly from two side drapers 20 behind a cutting knife 21 at the forward end of the header. The feed draper 18 is engaged around a roller 22 at the rear of the feed draper and in front of the feeder house and its chain 11. A pan 23 bridges the area between the rear of the draper 18 and the front of the feeder house so as to carry the material rearwardly. However it is necessary to provide a feed roller which assists the transfer of the crop material from the rear of the feed draper 18 into the feeder house and also applies a top compression to the crop material so as to hold it downwardly and assist in feeding the crop material under the feeder chain. Thus there is provided a roller 25 which extends across the width of the feeder house 10 as shown in FIG. 1 and slightly beyond the outside edges of the feeder house to a length so as to be located just within the extent of the feed draper 18 and between the side drapers 19 and 20. The roller 25 is carried on a pair of arms 26 one at each end each of which is pivotal about a pivot pin 27 carried on an adaptor frame 28 attached to the front of the feeder house. Thus the axis 29 of the roller can raise and lower pivoting about the axis of the pin 27 to accommodate more or less crop rolling or passing underneath the roller and over the pan 23.

Figure 4:
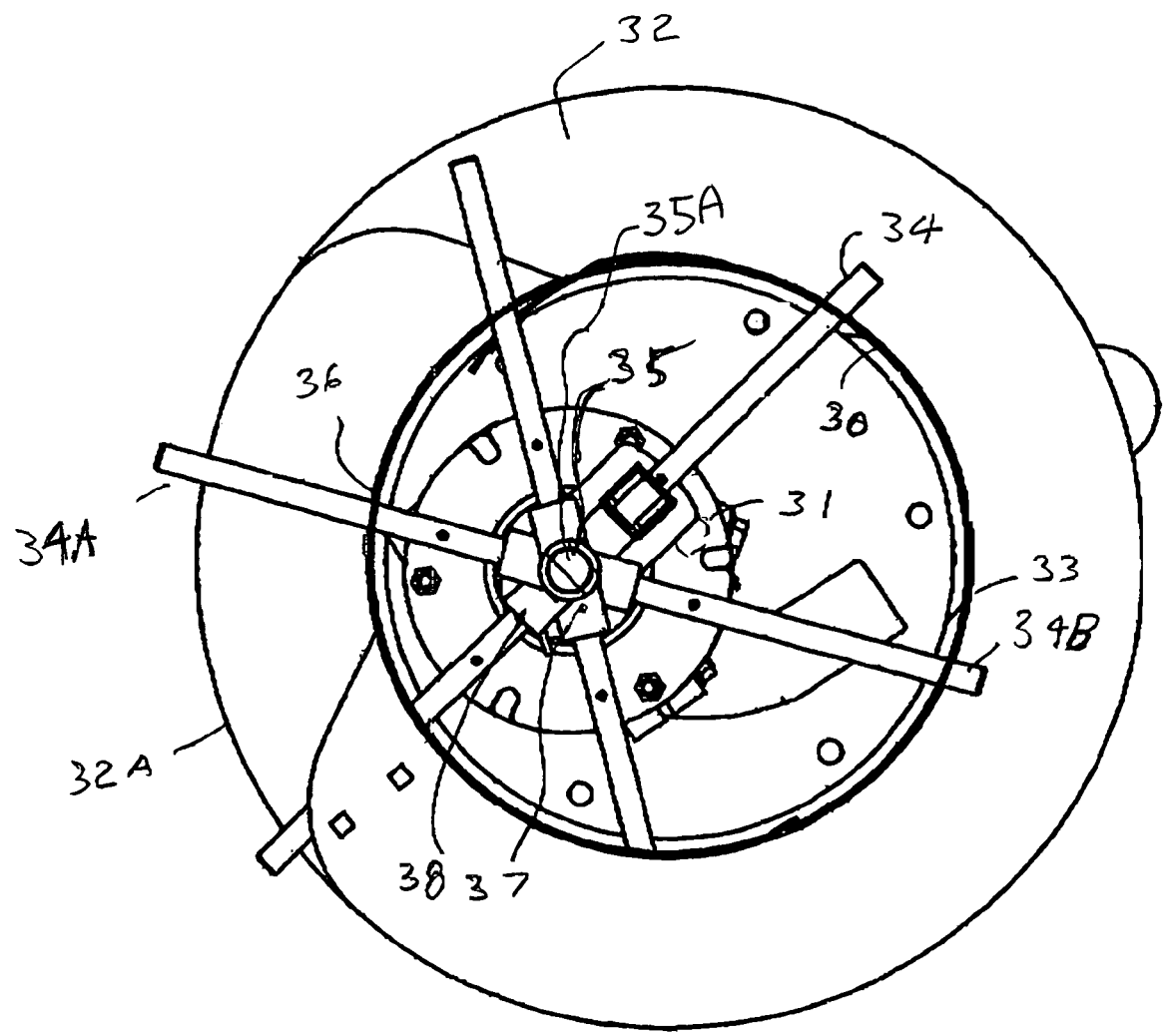
FIG. 4 is a detailed section of the auger in the normal forward operating position.

The roller 25 as best shown in FIG. 4 comprises a roller wall 30 which is cylindrical carried for rotation on a shaft 31 mounted suitably on the arms 26. On the outside surface of the roller is provided an auger flight 32 which is arranged helically around the wall 30 and its outer surface 33 so as to project outwardly therefrom. The auger flight, as is well known, is arranged in two sections coiled in opposite directions so as to tend to carry the crop inwardly as the roller rotates in a feeding or counter clockwise direction as shown in FIG. 4.

In addition the roller carries fingers 34 at angularly and axially spaced positions around the peripheral surface 33 of the roller. In the embodiment shown there are 6 angularly spaced positions of the fingers and 6 axially spaced positions of the fingers. However these numbers may vary in accordance with requirements.

The fingers are mounted for rotation about a finger shaft 35 carried inside the wall 30 of the roller. In the normal forward operating position of the roller, the shaft 35 is located forward of the shaft 31 of the roller so that the finger axis is forward of the roller axis. In this position one of the fingers indicated at 34A provides a maximum extension of the fingers beyond the surface 33 so that the finger projects beyond an outside edge 32A of the flight. This maximum extension position 34A is located on a line joining the finger axis and the roller axis and is generally at the nine o'clock position or immediately at the front of the roller facing the crop. This position may be slightly angularly advanced or slightly angularly retarded as required so that for example as shown in FIG. 2 with the roller in its lowered position close down onto the pan 23 the most extended position is approximately at the 8.30 position around the axis of the roller.

Symmetrically the most retracted position of the fingers is indicated at 34B which is located directly behind the roller at the three o'clock position. Thus the normal operation of the roller and the fingers carried thereby is that the fingers extend to their maximum extension in front of the rollers so as to grasp the crop in front of the roller and tending to pile in front of the roller and to push that crop downwardly and to carry it rearwardly in a feeding action over the pan 23 to the feeder house. Behind the roller the fingers gradually retract to the position indicated at 34B where the outer end of the finger is substantially flush with the surface 33 so as to ensure that the crop is released at this position and is not carried by the fingers in a wrapping action around the remainder of the roller.

The fingers are driven in rotation around the shaft 35 by the engagement of the fingers through holes 36 in the wall 30 of the roller. Thus each finger has its own hole an a suitable bearing arrangement (not shown) within the hole so that the forward or reverse rotation of the roller carries the finger around the finger shaft 35 with the finger extending radially of the shaft 35 from the shaft to the respective hole in the wall 30.

The fingers are carried in mounting elements 37 which form plastic bearings mounted on the finger shaft so that the bearings can rotated around the finger shaft which is stationary. Each finger has its own bearing member to allow it to rotate at its own angular velocity as required by the location of the respective hole in the roller. The fingers are inserted as a sliding fit into a collar 38 of the bearing 37 for ready replacement of damaged or broken fingers.

The above description relates to conventional constructions which are well known for providing a feeding action.

In the present invention the position of the finger axis 35 is movable to a second position rearward of the roller axis and shown in FIGS. 3 and 5. In this position the finger shaft 35 is moved from the first position 35A in FIG. 4 to the second position 35B shown in FIG. 5. In this position the shaft 35 is located behind the roller shaft which is not visible in FIG. 5 but is located at the axis of the wall 30 of the roller.

Thus as shown in FIG. 5, with the finger shaft 35 at the second position 35B, the maximum extent of the fingers is indicated at 34C which is approximately at the three o'clock position behind the roller. From that maximum extension the fingers gradually retract to a position 34D where the finger is again substantially flush with the surface 33 of the wall 30. As shown in FIG. 5 thus the maximum extension position is located in the area slightly underneath the conveyor chain 13 and its sprocket 12 so as to grasp material in that generally triangular area as indicated at 13A so as to tend to pull the crop material from that triangular area over the pan 23 forwardly to a position in front of the roller where it can be discharged. The fingers are retracted as they rotate thus pulling them out of any compression of the material in front of the roller or above the roller and releasing the fingers from that material so as to resist any possibility for the material to be wrapped around the roller or the material to the be compressed into the area above the roller and underneath the main frame tube 16.

Thus the finger shaft provides the first and second positions which can be used respectively with the forward and rearward rotation directions of the roller. This allows the normal forward action of the roller and the normal forward operation of the fingers but also adds a reverse operation in which the fingers assist in pulling the crop material in the reverse direction from the reversing feeder chain back over the pan to the front of the roller for discharge and the same time extracting the fingers from the crop material to prevent any wrapping or compression of the crop material in the area in front of the roller.

The movement of the finger shaft between the first and second positions is obtained automatically on reversal of the direction of rotation of the roller. In addition the change in position of the finger shaft is obtained using power from the change in direction.

Turning now to FIGS. 6 to 11, there is provided a clutch mechanism generally indicated at 101 which is responsive to the change in direction of the roller and thus of the fingers and carries the finger shaft 35 between the first and second positions.

FIG. 6 is a view of the clutch with auger surface and flighting not shown. The clutch 101 is driven by a selected one of the fingers indicated at 100. To the finger 100 is attached a tube 102 which is rotated by the finger 100. The tube 102 fits in a square hole in the clutch 101 and drives the clutch rotor through a drive plate 103, also shown on FIG. 10. The clutch drive plate 103 together with a clutch hub 104 and a clutch disc 105 rotate as a unit. The finger shaft 35 passes through the clutch and is clamped in a bar 106. The bar 106 rotates around the axis of the shaft 35 and rests at one angular position on a stop 107 when the auger is rotating forward and swings back to rest on a stop 108 angularly spaced from the stop 107 when the auger is reversed.

Figure 10:
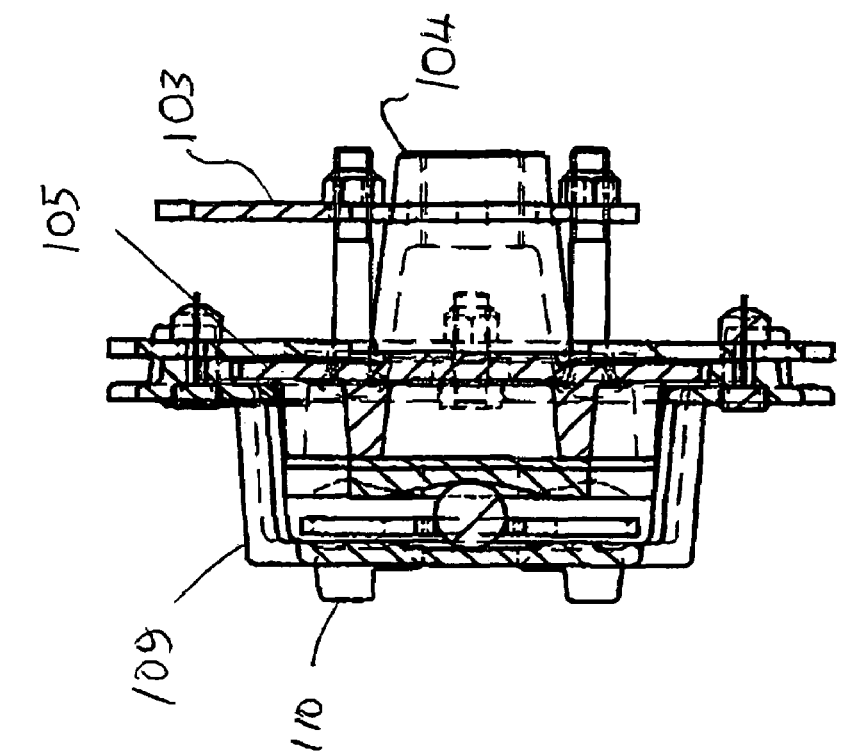
FIG. 10 is a cross sectional view along the lines 10-10 of FIG. 9.
Figure 9:
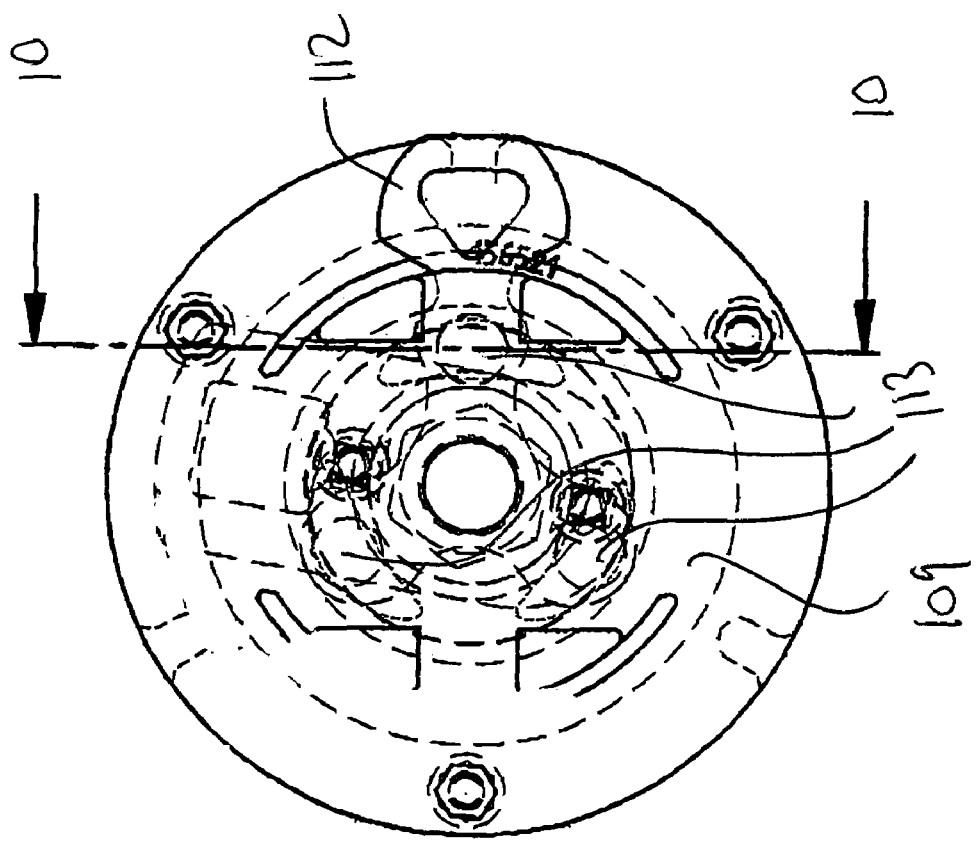
FIG. 9 is an end view of the clutch of FIG. 7 in the stable forward position of the finger shaft during forward rotation of the roller.

The clutch has a clutch housing 109 which is mounted on the finger shaft 35 and has lugs 110 that engage the bar 106 so that the clutch housing 109 rotates with the bar 106. FIGS. 9 and 10 show the clutch disengaged. FIG. 11 and FIG. 12 show the clutch engaged as it would be when the auger starts to reverse. There are three balls 113 located in contact with the housing 109 and a clutch operating arm 112. There are three depressions in the clutch operating arm that the balls fit into. A plate 111 has three holes that maintain the relative location of the three balls. A thrust bearing 123 is located between the rotating clutch, hub 104 and the clutch operating arm 112. A pressure plate 114 is bolted to the clutch housing 109. The parts are arranged so that when the balls 113 are in the bottom of the depressions in the arm 112 the clutch disk 105 does not contact the pressure plate 114. When the balls roll up a ramp defined in the depressions of the arm 112 they force the hub to move so that the pressure plate contacts the disk and the friction causes the clutch to lock and rotate the finger shaft from one position to the other.

When operating in the forward direction, the bar 106 and the plate 111 and the arm 112 rest on the stop 107 as shown in FIG. 6.

When the auger is reversed the drum drives the finger 100 in reverse and that in turn drives the clutch hub and clutch disk in reverse. A spring 65 maintains axial force on the hub 104 which maintains low pressure on thrust washer 123. The friction between the thrust washer 123 and the clutch operating arm 112 causes the arm to rotate up away from the stop. As the arm rotates, the balls 113 roll up the ramp 124 in the recesses 125 in the arm 112 and cause high pressure and friction between the pressure plate 114 and the clutch disk 105.

The high friction will lock the clutch and cause the finger shaft 35 to rotate from the forward operating position to the reverse position.

As the finger shaft assembly approaches the reverse position the arm 112 contacts the stop 108. As the finger shaft assembly continues to rotate the arm 112 is rotated to move the balls 113 into the deepest part of the depression 125 and disengage the clutch leaving clutch arm 112 and the plate 111 and bar 106 in contact with the reverse stop 108.

The first position is defined by the stop 107 and the second position is defined by the stop 108. The clutch 101 which carries the shaft 35 between the two positions 35A and 35B is mounted for pivotal movement on an additional lay shaft 54 which is carried on the main shaft 31 of the roller at a fixed position relative thereto. Thus the rotation of the shaft 35 carried on the clutch 101 does not take place about the shaft 31 of the roller but is instead about an axis of the shaft 54 which is offset from the axis 31A of the roller at a position below the axis of the roller, as best shown in FIG. 8. The position of the shaft 54 governs the arcuate movement of the shaft 35 between the first and second positions and thus co-operates with the stops 107 and 108 in locating the first and second positions so as to locate these positions for the best operation by optimizing the angular position of the maximum extent of the fingers as described above.

The amount of movement of the shaft 35 is of the order of 120 degrees around the shaft 54 and this distance has been determined to provide the best finger patterns in both the forward and reverse directions.

Thus as best shown by comparing FIGS. 6 and 11, arms 111 and 112 project from the interior of the clutch and act to control the actuation and release of the clutch. In addition the bar 106 is fixed to the housing of the clutch and also projects outwardly to the side of the clutch for controlling the rotation of clutch and thus the rotation of the finger shaft around the shaft 54. The bar 106 together with the arms 111 and 112 all are arranged to contact the stops 107 an 108 at either end of the movement of the clutch and the finger shaft.

When the clutch and the finger shaft are in stable position at one end of the movement, the arms 111, 112 and 106 are all butting one of the end stops. In this position the arms 111 and 112 act to release the clutch so that the fingers can rotate around the finger shaft with the roller while the clutch remains stationary despite the drive input from the rotation of the drive arm 102.

On the reversal of the rotation of the roller, the input of the clutch is driven in the reverse direction and this acts to communicate this reversed direction movement to the arm 112 through the thrust bearing 123 by way of the pressure from the spring 65 which presses the clutch input shaft 104 onto the arm 112. Thus the arm 112 commences rotation due to this friction which actuates the engagement of the clutch due to the relative movement between the arms 112 and 111 thus forcing the balls 113 to engage the clutch. With the clutch thus engaged, the rotation of the fingers caused by the rotation of roller act to drive the clutch carrying the finger shaft, the arms 111 and 112 and the bar 106 from the stop at which they were previously located toward the other stop. On reaching the other stop, the arm 112 engages the stop and acts to release the clutch so that the fingers can continue to rotate in the reverse direction while the clutch and the finger shaft remain in the new position adjacent the new stop. This operation is carried out each time the direction of rotation reverses acting to move the clutch and the finger shaft from the first stop to the second stop and back to the first stop as required.

Thus it will be appreciated that the movement of the finger shaft from the forward first position to the rearward second position is obtained automatically immediately on reversal of the direction of the roller. In this embodiment therefore there is no necessity for a separate actuator which effects this movement and the power for the movement is obtained from the rotation of the roller itself.

The objective is therefore that the finger shaft is moved to the required second or rearward position during the reverse rotation of the roller. Other clutch arrangements can be provided of a different design which take up the movement of the roller and use this to effect the translation of the position of the finger shaft.

In the alternative an actuator can be provided which takes power from the switching action to change the operation of the roller from forward to reverse so that the actuator effects the necessary movement. This can be effected electrically or hydraulically depending upon the availability or power and the convenience depending upon the necessary switching circuit.

Turning now to FIGS. 13 and 14, the whole of the roller is shown in FIG. 13 with many of the fingers omitted for convenience of illustration. It will be noted that the finger shaft 35 extends along the full length of the roller and is carried at one end on the mounting previously described including the clutch 101 and the shaft 54. At the opposite end is arranged a symmetrical mounting generally indicated at 130 which is arranged so that the rotation of the clutch and the finger shaft carried thereby around the axis of the shaft 54 is effected symmetrically at the opposite end.

The positions of the finger shaft and the length of the fingers is arranged relative to the inside surface 30A of the wall 30 and the outside surface 33 of the wall 30 so that in the retracted position the end of the finger is substantially flush with the outside surface 33. Plastic guides can be provided (not shown) which reduce the friction between the finger and the wall as the finger moves in and out of the opening. With the end of the finger being flush with the outside surface or very slightly proud of the outside surface, any movement of the finger shaft away from the wall along the length of the finger could cause the finger to be retracted inside the inside surface 30A. As soon as this occurs, the finger is released from its guidance by the opening in the wall and the finger can rotate away from the opening to another position within the wall so that when extended by further rotation of the roller, the finger moves outwardly of the roller at a position misaligned with the opening causing significant damage.

In order to prevent this, an anti-distortion wheel 131 is provided which is mounted on the finger shaft 35 for rotation around the axis of the finger shaft. The wheel 131 has an outer periphery 132.

The wheel 131 in the embodiment shown is located at the end adjacent the mounting 130. In this embodiment the maximum position for distortion by twisting of the finger shaft relative to the roller occurs at the end mounting 130.

In other embodiments the position for maximum distortion may occur at the center of the finger shaft due to bending of the finger shaft. However, regardless of where the maximum distortion position occurs, the wheel is located to restrict the possibility for the finger to be retracted inside the inside surface of the roller.

The diameter of the wheel 131 is arranged relative to the inside surface of the roller so that the wheel is clear from the inside surface during normal operation when the finger shaft is in its proper position. Thus the wheel does not contact the inside surface during normal operation and only contacts the inside surface when it is required to prevent the retraction of the finger indicated at 34X as shown best in FIG. 14 inwardly to a position inward of the inside surface 30A. Thus the space 133 between the inside surface and the peripheral surface of the wheel at the position opposite the finger 34X is arranged so that it is less than the distance 134 necessary to cause the end of the finger to be retracted inside the surface 30A. In this way, before the retraction beyond the inside surface can occur, the wheel engages the inside surface of the roller and prevents further movement by restricting the distortion of the finger shaft.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop feed roller apparatus comprising:
   a roller;
   a mounting assembly mounting and driving the roller for rotation about a longitudinal axis of the roller in a forward direction and in a reverse direction;
   a crop feed assembly cooperating with the roller such that movement of an outer peripheral surface of the roller in the forward direction causes feeding of a crop material around the axis of the roller from a supply location on one side of an axial plane of the roller to a receiving location on the other side of the axial plane of the roller;
   the crop feed assembly and the roller being arranged for rotation of the roller in the reverse direction for backfeeding of the crop material in the event of a blockage;
   a plurality of fingers arranged at axially and angularly spaced locations around the roller;

each finger having an inner end inside an interior of the roller and arranged to project outwardly from the interior of the roller through the peripheral surface to an outer end for engaging the crop material on the exterior of the roller for assisting in transferring the crop material from the supply location to the receiving location;

the fingers having the inner ends thereof mounted on a finger support shaft within the roller for rotation of the fingers about a finger axis defined by the finger support shaft;

the fingers each extending through an opening in the peripheral surface of the roller such that the fingers are driven in rotation about the finger axis by rotation of the roller about the roller axis;

a support assembly for supporting the finger support shaft within the roller;

the support assembly being arranged to locate the finger support shaft so as to locate the finger axis at a location which is offset from the roller axis such that a portion of the fingers which extends beyond the peripheral surface varies around the roller axis from an extended maximum extent to a retracted minimum extent;

the support assembly defining a pivot axis and including elements which are pivotal about the pivot axis and which carry the finger support shaft so as to cause movement of the finger support shaft in an arc about said pivot axis;

the support assembly being arranged to define for the finger support shaft, with the roller arranged to rotate in the forward direction, a first finger axis position which is located on the side of the axial plane adjacent the supply location such that the extended maximum extent is adjacent the supply location and the retracted minimum extent is adjacent the receiving location;

and the support assembly being arranged to define for the finger support shaft, with the roller arranged to rotate in the reverse direction, a second finger axis position which is located on the side of the axial plane adjacent the receiving location such that the extended maximum extent is adjacent the receiving location and the retracted minimum extent is adjacent the supply location;

wherein the support assembly defines the pivot axis such that it is parallel to and offset from the axis of the roller and the support assembly includes elements which are pivotal about the pivot axis and which carry the finger support shaft so as to cause the finger axis to move between the first finger axis position and the second finger axis position in an arc about said pivot axis which is offset from the axis of the roller.

2. The apparatus according to claim 1 wherein the support assembly is arranged to move the finger axis from the first position to the second position automatically when the direction of rotation of the roller is changed to the reverse direction and to move the finger axis from the second position to the first position automatically when the direction of rotation of the roller is changed from the reverse direction to the forward direction.

3. The apparatus according to claim 1 wherein the support assembly is arranged to move the finger axis in response to the change in direction of the roller.

4. The apparatus according to claim 1 wherein the support assembly includes a clutch which is driven in response to rotation of the roller, the clutch being disengaged when the roller rotates in one direction beyond a predetermined angle and is engaged when the roller changes to the other direction.

5. The apparatus according to claim 1 wherein the support assembly includes two angularly space stops each defining a respective one of the first and second positions.

6. The apparatus according to claim 1 wherein the support assembly includes a drive coupling for receiving driving force from at least one of the fingers.

7. The apparatus according to claim 1 wherein the peripheral surface of the roller carries a helical flight and wherein the fingers in their maximum extent project outwardly beyond the outer edge of the flight.

8. A harvesting machine comprising:
a feeder house having a conveyor chain therein for transporting a crop material;
and a crop feed roller apparatus according to claim 1 in front of the feeder house for feeding the crop material into the feeder house.

9. The harvesting machine according to claim 8 including a draper in front of the feed roller apparatus.

10. A crop feed roller apparatus comprising:
a roller;
a mounting assembly mounting and driving the roller for rotation about a longitudinal axis of the roller in a forward direction and in a reverse direction;
a crop feed assembly cooperating with the roller such that movement of an outer peripheral surface of the roller in the forward direction causes feeding of a crop material around the axis of the roller from a supply location on one side of an axial plane of the roller to a receiving location on the other side of the axial plane of the roller;
the crop feed assembly and the roller being arranged for rotation of the roller in the reverse direction for back-feeding of the crop material in the event of a blockage;
a plurality of fingers arranged at axially and angularly spaced locations around the roller;
each finger having an inner end inside an interior of the roller and arranged to project outwardly from the interior of the roller through the peripheral surface to an outer end for engaging the crop material on the exterior of the roller for assisting in transferring the crop material from the supply location to the receiving location;
the fingers having the inner ends thereof mounted on a finger support shaft within the roller for rotation of the fingers about a finger axis defined by the finger support shaft;
the fingers each extending through an opening in the peripheral surface of the roller such that the fingers are driven in rotation about the finger axis by rotation of the roller about the roller axis;
a support assembly for supporting the finger support shaft within the roller;
the support assembly being arranged to locate the finger support shaft so as to locate the finger axis at a location which is offset from the roller axis such that a portion of the fingers which extends beyond the peripheral surface varies around the roller axis from an extended maximum extent to a retracted minimum extent;
the support assembly defining a pivot axis and including elements which are pivotal about the pivot axis and which carry the finger support shaft so as to cause movement of the finger support shaft in an arc about said pivot axis;
the support assembly being arranged to define for the finger support shaft, with the roller arranged to rotate in the forward direction, a first finger axis position which is located on the side of the axial plane adjacent the supply location such that the extended maximum extent is adjacent the supply location and the retracted minimum extent is adjacent the receiving location and the support assembly being arranged to define for the finger support shaft, with the roller arranged to rotate in the reverse direction, a second finger axis position which is located on the side of the axial plane adjacent the receiving location such that the extended maximum extent is adjacent the receiving location and the retracted minimum extent is adjacent the supply location;

wherein there is provided a linkage between the roller and the support assembly arranged such that rotation of the roller is communicated from the roller to the linkage and from the linkage to the support assembly to drive movement of the finger support shaft between the first finger axis position and the second finger axis position.

11. The apparatus according to claim 10 wherein the linkage is arranged to move the finger axis in response to initial movement of the roller following a change in direction of the roller.

12. The apparatus according to claim 11 wherein the support assembly includes a clutch which is driven in response to said initial rotation of the roller, the clutch being disengaged when the roller rotates in one direction beyond a predetermined angle and is engaged when the roller changes to the other direction.

13. The apparatus according to claim 10 wherein the support assembly includes two angularly space stops each defining a respective one of the first and second positions.

14. The apparatus according to claim 10 wherein the linkage includes a drive coupling for receiving driving force from the roller through at least one of the fingers.

15. The apparatus according to claim 10 wherein the support assembly defines the pivot axis such that it is parallel to and offset from the axis of the roller and the support assembly includes elements which are pivotal about the pivot axis and which carry the finger support shaft so as to cause the finger axis to move between the first finger axis position and the second finger axis position in an arc about said pivot axis which is offset from the axis of the roller.

16. The apparatus according to claim 10 wherein the peripheral surface of the roller carries a helical flight and wherein the fingers in their maximum extent project outwardly beyond the outer edge of the flight.

17. A crop feed roller apparatus comprising:

a hollow roller having an interior cylindrical surface surrounding a longitudinal axis of the roller and an outer peripheral surface;

a mounting assembly mounting and driving the roller for rotation about the longitudinal axis of the roller in a forward direction and in a reverse direction;

a crop feed assembly cooperating with the roller such that movement of the outer peripheral surface of the roller in the forward direction causes feeding of a crop material around the axis of the roller from a supply location on one side of an axial plane of the roller to a receiving location on the other side of the axial plane of the roller;

the crop feed assembly and the roller being arranged for rotation of the roller in the reverse direction for back-feeding of the crop material in the event of a blockage;

a plurality of fingers arranged at axially and angularly spaced locations around the roller;

each finger having an inner end inside an interior of the roller and arranged to project outwardly from the interior of the roller through the peripheral surface to an outer end for engaging the crop material on the exterior of the roller for assisting in transferring the crop material from the supply location to the receiving location;

the fingers having the inner ends thereof mounted on a finger support assembly within the roller for rotation of the fingers about a finger axis defined by the support assembly;

the fingers each extending through a guide opening in the peripheral surface of the roller such that the fingers are driven in rotation about the finger axis by rotation of the roller about the roller axis;

the finger support assembly being arranged to locate the finger axis at a location which is offset from the roller axis such that a portion of the fingers which extends beyond the peripheral surface varies around the roller axis from an extended maximum extent to a retracted minimum extent;

the finger support assembly being arranged to define for the fingers, with the roller arranged to rotate in the forward direction, a first finger axis position which is located on the side of the axial plane adjacent the supply location such that the extended maximum extent is adjacent the supply location and the retracted minimum extent is adjacent the receiving location;

and the finger support assembly being arranged to define for the fingers, with the roller arranged to rotate in the reverse direction, a second finger axis position which is located on the side of the axial plane adjacent the receiving location such that the extended maximum extent is adjacent the receiving location and the retracted minimum extent is adjacent the supply location;

the finger support assembly including a finger shaft defining the finger axis around which the fingers rotate with the roller;

wherein the fingers have a length relative to the finger shaft and the roller such that, in the position of retracted minimum extent, the outer end of the finger is approximately flush with the outer surface of the roller and such that, in the event of distortion under load of the finger support assembly, it is possible that the outer end of at least one of the fingers retracts into a release position in which it is released from the guide opening and can thus rotate relative to the roller and cause damage when extended by no longer passing through the guide opening;

and an anti-distortion wheel mounted on the finger shaft for rotation around the finger axis of the finger shaft, the anti-distortion wheel being mounted inside the roller and having an exterior peripheral surface arranged to contact and roll upon the interior cylindrical surface of the roller, in the event of distortion under load of the finger support assembly, to prevent the at least one finger from retracting to the release position.

18. The apparatus according to claim 17 wherein the anti-distortion wheel is has a diameter such that the peripheral surface, in a non-distorted position of the finger support assembly, is spaced from the interior cylindrical surface of the roller and the peripheral surface only touches the interior cylindrical surface in the position where sufficient distortion has occurred to move the finger nearly to the release position.

* * * * *